(12) United States Patent
Bora

(10) Patent No.: US 11,448,555 B2
(45) Date of Patent: *Sep. 20, 2022

(54) NON-DESTRUCTIVE, IN-SITU EVALUATION OF WATER PRESENCE USING THERMAL CONTRAST AND COOLED DETECTOR

(71) Applicant: Lawrence Livermore National Security, LLC, Livermore, CA (US)

(72) Inventor: Mihail Bora, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/103,670

(22) Filed: Nov. 24, 2020

(65) Prior Publication Data
US 2021/0080329 A1 Mar. 18, 2021

Related U.S. Application Data

(63) Continuation of application No. 16/004,196, filed on Jun. 8, 2018, now Pat. No. 10,962,417.

(51) Int. Cl.
*G01J 5/08* (2022.01)
*G01J 5/00* (2022.01)
*G01J 5/0806* (2022.01)

(52) U.S. Cl.
CPC ........... *G01J 5/0896* (2013.01); *G01J 5/0037* (2013.01); *G01J 5/0806* (2013.01)

(58) Field of Classification Search
USPC .............................. 374/121, 130, 132, 45, 1
See application file for complete search history.

(56) References Cited

U.S. PATENT DOCUMENTS

| | | | | |
|---|---|---|---|---|
| 3,883,752 A | * | 5/1975 | Davies ..................... | G02B 1/00 359/328 |
| 4,607,963 A | * | 8/1986 | Ulrickson ............. | G01J 5/0859 374/131 |
| 2018/0157012 A1 | * | 6/2018 | Jin ......................... | G02B 5/208 |

OTHER PUBLICATIONS

Bora, M., U.S. Appl. No. 17/183,122, filed Feb. 23, 2021.
Restriction Requirement from U.S. Appl. No. 17/183,122, dated Jul. 12, 2022.

* cited by examiner

*Primary Examiner* — Mirellys Jagan
(74) *Attorney, Agent, or Firm* — Zilka-Kotab, P.C.

(57) ABSTRACT

Exemplary systems for detecting water include: a light source positioned to transmit thermal radiation through a sample; a lens assembly positioned to: receive the thermal radiation transmitted through the sample; and focus the transmitted thermal radiation onto a filter positioned between the lens assembly and a detector; and a cooling subsystem for cooling the filter and the detector to a temperature below that of the sample. Methods for detecting presence of water in a sample are also disclosed.

20 Claims, 3 Drawing Sheets

NON-DESTRUCTIVE, IN-SITU EVALUATION OF WATER PRESENCE USING THERMAL CONTRAST AND COOLED DETECTOR

The United States Government has rights in this invention pursuant to Contract No. DE-AC52-07NA27344 between the United States Department of Energy and Lawrence Livermore National Security, LLC for the operation of Lawrence Livermore National Laboratory.

RELATED APPLICATION

This application claims priority to U.S. Non-Provisional patent application Ser. No. 16/004,196 filed Jun. 8, 2018, which is herein incorporated by reference.

FIELD OF THE INVENTION

The present invention relates to detection of water in various materials, and more particularly, this invention relates to non-destructive, in-situ evaluation of water presence using systems including a black body as a light source and a cooled detector.

BACKGROUND

The ingress of water into various materials, such as photovoltaic modules and display materials such as organic light emitting diodes (OLEDs), quantum dots, etc. is known to cause performance loss related to corrosion, mechanical stress and optical transmittance degradation of encapsulating materials, typically polymers. It is estimated that 2% of photovoltaic modules fail within 8 years of operation and that 16% of these failures are related to encapsulant degradation. Due to the long lifetime of modules (30 years) this problem is difficult to avoid even by using low water diffusivity materials. Mitigation approaches include the use of moisture barriers (glass) for the front and back sheet of the module as well as sealing the edges with desiccant filled polymers.

To evaluate durability and resistance to water ingress, conventional techniques involve incubating the sample in hot, damp conditions for an extended period, such as 85 centigrade and 85% humidity for a period of 1000 hours.

After incubation, measurement of water content can be accomplished using one of two conventional techniques. First, measurement may be accomplished destructively by taking samples from different sections of the module. Second, measurement may be accomplished by using colorimetric reporters such as calcium films that exhibit a change in optical properties upon interaction with water.

Destructive evaluation has the downside that it is time consuming and measurement on the same module cannot be repeated, limiting the amount of collected data. Colorimetric tests, while non-destructive, can undesirably alter diffusion kinetics, may present additional issues related to integration with the fabrication processing, and cannot be performed on existing deployed modules unless those modules already contain appropriate reporter compounds.

There is therefore a need for fast, non-destructive and in-situ evaluation method of water ingress that can reliably evaluate the presence of water in various materials.

SUMMARY

According to one embodiment, a system for detecting presence of water in a sample includes: a light source positioned to transmit thermal radiation through a sample; a lens assembly positioned to: receive the thermal radiation transmitted through the sample; and focus the transmitted thermal radiation onto a filter positioned between the lens assembly and a detector; and a cooling subsystem thermally coupled to at least the filter and the detector to cool the filter and the detector to a temperature below a temperature of the sample.

According to another embodiment, a method of detecting water in a sample includes: heating a light source to a predetermined temperature at which the light source emits thermal radiation; placing a sample between the light source and a detector; transmitting the thermal radiation from the light source through the sample and onto the detector; and determining a presence or an absence of water within the sample based on the thermal radiation transmitted onto the detector.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

DETAILED DESCRIPTION

Figure 1A:
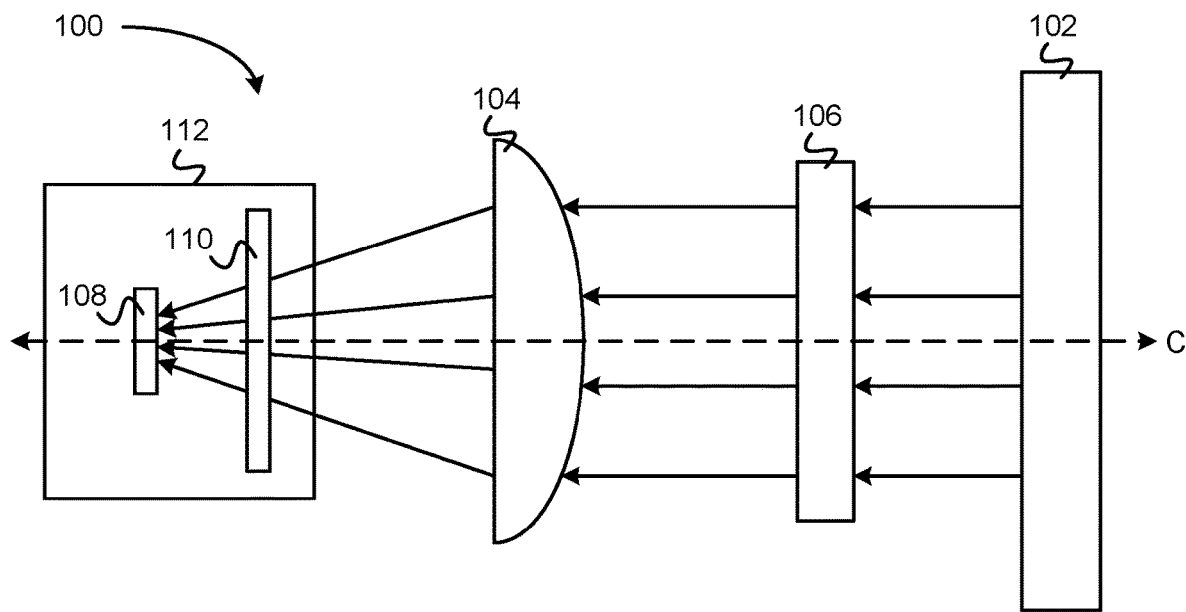
FIG. 1A is a simplified side-view schematic of a non-destructive, in-situ water ingress investigation system, according to one embodiment of the presently disclosed inventive concepts.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

"Light sources" as referenced in the present descriptions include any suitable source of radiation, preferably thermal radiation, characterized by an emission temperature that differs from a temperature of the sample being interrogated. The temperature preferably differs by at least about 1 C, more preferably at least about 5 C, in different embodiments. Moreover, the thermal radiation may be "substantially uniform" as in the case of "black bodies," but need not necessarily be uniform, e.g. in the case of light sources including an infrared laser or infrared light emitting diode (LED), according to several exemplary embodiments.

As utilized herein, the term "black body" shall be understood as referring to actual materials (not ideal concepts in physics) that strongly emulate the predicted properties of an ideal black body. Black body materials include a head and an optically absorptive coating. The head includes one or more materials characterized by substantially uniform emission of thermal radiation within a temperature range from about −5 C to about 150 C. The optically absorptive coating absorbs at least 99% of all incident radiation to which the coating is exposed, and preferably absorbs at least 99.9% of such incident radiation.

As described herein, "substantially uniform" temperature, thermal emission, etc. refers to a state in which the object in question exhibits temperature variations of less than 0.01 C over a given amount of time, e.g. an amount of time required to capture an image of the object. To facilitate a given material exhibiting substantially uniform temperature, a black body may be thermally coupled to a heater and operatively coupled to a controller so that heat may be provided to the black body until the black body reaches substantially uniform temperature (e.g. a heating time from about 1 to about 5 minutes), and maintained at the substantially uniform temperature for a predetermined duration, e.g. an amount of time sufficient to capture one or more images of the black body.

For both black bodies and other sources of thermal radiation, it shall be understood that presence of water may be evaluated in samples using a source and sample characterized by a temperature difference of at least 1 C, but may be on the order of $10^1$-$10^3$, in various embodiments. In several experiments performed during and after development of the inventive concepts presented herein, the sample and source were characterized by a relative temperature difference of about 100 C. Those having ordinary skill in the art will appreciate that the particular temperature difference chosen for a given sample/source combination will depend on the properties of each, particularly the sample. Accordingly, in various embodiments the temperature of the sample and the temperature of the light source may be characterized by a difference in a range from 1 C to about 1000 C, e.g. 1 C, 10 C, 100 C, 250 C, 500 C, 750 C, 1000 C, and any value(s) therebetween.

As utilized herein, the term "about" refers to a given value, ±10% of the given value.

The following description discloses several preferred embodiments of non-destructive, in-situ evaluation of water presence in various materials, and/or related systems and methods.

The presently disclosed inventive concepts are directed to a non-invasive optical detection system and techniques based on infrared imaging of samples exposed to thermal radiation from a source, preferably a black body. If the spectral range revealed under illumination overlaps one or more, preferably several, absorption lines and/or bands of water, it is possible to achieve high resolution moisture evaluation corresponding to differential image acquisition on and/or off absorption lines and/or bands. As will be appreciated by those having ordinary skill in the art upon reading the present descriptions, absorption lines typically refer to vapor phase compounds, while absorption bands typically refer to liquid phase compounds or compounds diffused in sample material, e.g. water diffused in polymer.

Experimental evidence demonstrates estimation of differential absorbance suggests a change in intensity of approximately 3% between on and off absorbance imaging for 0.1% moisture content. Notably, since most of the materials used in fabrication of samples including but not limited to: photovoltaic modules, OLED displays, quantum dots, etc., said materials including those such as glass, silicon, polymers, or aluminum that are either transparent or reflective, samples typically do not exhibit large changes in extinction for the spectral region considered, advantageously providing limited interference with the differential absorbance of water.

However, a key challenge is presented by adapting the technique to modules with complex structure made of multiple layers with various material properties, composition and roughness. Because the surfaces are not optically perfect, resolution issues related to scattering off grain boundaries and interfaces arise. To an extent, this problem is mitigated by the relatively large expected diffusion length of moisture (on the order of centimeters).

Another potential issue is related to water-polymer interaction influence on the infrared absorption spectrum as hydrogen bonding of water to functional groups alter molecular absorbance spectrum both as a red spectral shift and as line width broadening as a result of hydrogen bonding of water to polymeric chemical functional groups.

Accordingly, these descriptions propose an approach to determine water ingress across an entire sample, even in non-transparent samples.

The inventive imaging system described herein, according to one implementation, principally includes an infrared camera body, an objective lens assembly, a black body used for both calibration and as a light source in the actual measurement, communication ports, and a graphical user interface that will allow the customer to interact with the equipment. The GUI may be deployed as part of a desktop software application including/facilitating the following features: image acquisition parameters (e.g. integration time and frame rate), non-uniformity correction, a live video feed, image freeze functions, image save/load functionality, image zoom in/out and pan, automatic gain control, and manual adjustment of contrast and brightness, as an example.

In accordance with one embodiment of the inventive concepts presented herein, the system may exhibit advantageous operative aspects including but not limited to a sensitivity not exceeding about 25 mK NEdT at room temperature, e.g. a temperature ranging from about 25 C to about 30 C. Controlling the sensitivity of the system in this manner may advantageously facilitate sample independent metrics and corresponding precision of the system. Of course, in other embodiments the system may advantageously be capable of operating with a sensitivity different than specified above, without departing from the scope of the inventive concepts disclosed herein.

Additionally or alternatively, the system may be characterized by a readiness time (i.e. time for closed circuit sensor cooling to a desired operational temperature) of about 10 minutes or less.

According to one general embodiment, a system for detecting presence of water in a sample includes: a light source positioned to transmit thermal radiation through a sample; a lens assembly positioned to: receive the thermal radiation transmitted through the sample; and focus the transmitted thermal radiation onto a filter positioned between the lens assembly and a detector; and a cooling subsystem thermally coupled to at least the filter and the detector to cool the filter and the detector to a temperature below a temperature of the sample. The filter is configured to: selectively transmit, to the detector, first portions of the thermal radiation received from the lens assembly, the first portions being characterized by a wavelength at least partially overlapping a predefined water absorption band and/or a predefined water absorption line; and selectively block second portions of the thermal radiation received from the lens assembly, the second portions being characterized by a wavelength outside the predefined water absorption band and/or the predefined water absorption line.

According to another general embodiment, a method of detecting water in a sample includes: heating a light source to a predetermined temperature at which the light source emits thermal radiation; placing a sample between the light source and a detector; transmitting the thermal radiation from the light source through the sample and onto the detector; and determining a presence or an absence of water within the sample based on the thermal radiation transmitted onto the detector.

In its simplest operational architecture the system includes a light source and a detector. The sample will be inserted in between the two elements to measure transmission. To operate the system in background (non-uniformity correction) mode no sample is placed between the source and detector. In order to improve accuracy the background is measured at two temperatures, ideally approximately 10 C above and below the apparent temperature of the sample under analysis.

The light source is preferably, but not necessarily, a black body system composed of a head (a textured aluminum surface covered by high emissivity paint) and a heater that will control through a thermal sensor feedback loop the head temperature. The user interacts with the black body control through an interface that contains two switches (main power, and power on for the black body head) and a touch screen where the temperature set point entered and where the actual temperature is displayed. In one embodiment, for example, when the actual temperature is stable in time (as determined by the controller) and within a certain threshold, (e.g. 0.01 C, 0.05 C, 0.1 C, 1 C, 10 C, etc. in various embodiments) of the set point the user is notified with a visual signal on the touch screen interface.

The light source may additionally or alternatively include any source fitting within the definition provided above, i.e. exhibiting an emission temperature differing from that of the sample being interrogated, whether or not such emission temperature exhibits substantial uniformity as for the case of black bodies.

To operate the system in the imaging mode, the detector is arrayed in individual pixels (e.g., 640×512 pixel resolution) such that transmission in multiple points in the sample is measured at the same time. To accommodate the larger area the light source (black body) is extended to cover the entire sample and a lens is introduced to produce an image of the sample onto the sensor (focal plane array).

For improving signal to noise ratios, a filter is placed before the focal plane array to transmit only light that covers the water absorption band (approximately 2.5 to 3.3 microns, or subbands defined therein). The filter and sensor are assembled in closed circuit cooling enclosure that lowers the temperature of these two elements, (e.g., to that of solid carbon dioxide, liquid nitrogen, etc. in various embodiments) to increase the signal to noise in the focal plane array and to decrease the background resulted from thermal emission of the filter. Of course, the cooling need not necessarily be to the precise temperature of the foregoing exemplary materials, but preferably occurs to a degree sufficient to lower the temperature of the filter and sensor so as to decrease or eliminate thermal background radiation and improve the signal-to-noise ratio in the focal plane array.

During the calibration procedure (two point non-uniformity correction, described further below with reference to method 300 and FIG. 3) the user may start the procedure in the desktop application, define the camera acquisition parameters (e.g. integration time and frame rate), put the lens assembly on the camera, bring the black body to the first temperature point, wait for the temperature to stabilize and follow the prompt from the software to record an image while the entire field of view of the camera is covered by the black body. The process is repeated for the second temperature set point and the software will adjust the camera settings to output a flat response when imaging a uniform surface. For the sample measurement the user will place the sample in between the black body and the camera, manually adjust the location of the sample and the focus of the lens assembly to achieve the desired magnification and a sharp image, while observing the camera output on the screen in live video mode. If a result is deemed acceptable the user will freeze the live video feed and save a picture of the sample for later use.

Data processing will be performed within the desktop application either on newly or previously acquired images. Software buttons will allow the user to select the file, automatically scale the intensity of the image to fully utilize the display greyscale and if desired manually change the brightness and contrast to better visualize samples of interest. To determine quantities that are relevant to the tested sample the user will input sample characteristics (saturation values, sample composition and layer thickness) and the software will output water vapor transmission rate, diffusion coefficient, mapping of water concentration values. Results will be saved in a format that is easily incorporated in reports for quality control charts.

Turning now to the figures, FIG. 1 depicts a system 100 for non-destructive evaluation of water ingress into samples (e.g. photovoltaic modules, OLED devices, quantum dots, minerals, coatings, raw materials, organic compounds, polymers, etc., in different approaches) using hyperspectral infrared imaging, in accordance with one embodiment. As an option, the present system 100 may be implemented in conjunction with features from any other embodiment listed herein, such as those described with reference to the other FIGS. Of course, however, such system 100 and others presented herein may be used in various applications and/or in permutations which may or may not be specifically described in the illustrative embodiments listed herein. Further, the system 100 presented herein may be used in any desired environment.

Figure 1B:
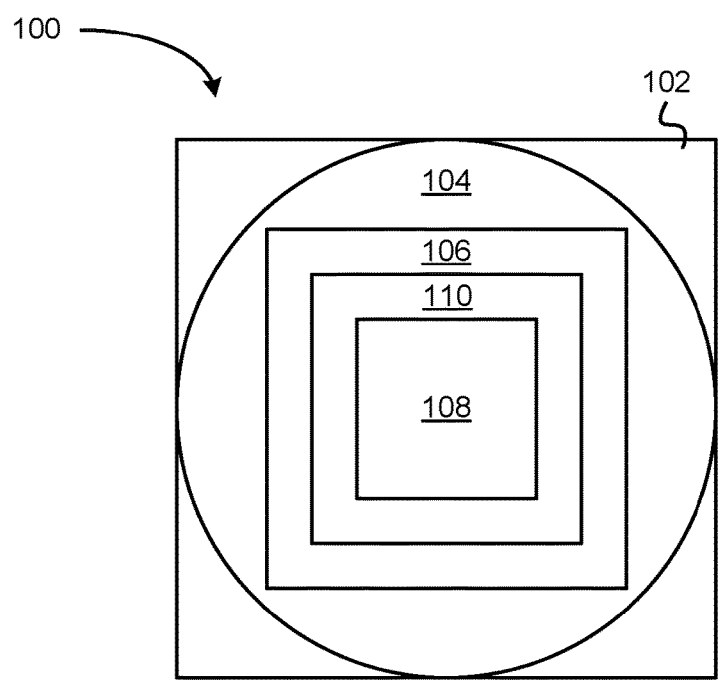
FIG. 1B is a simplified front-view schematic of a non-destructive, in-situ water ingress investigation system, according to one embodiment of the presently disclosed inventive concepts.

As shown in the embodiment represented by FIGS. 1A-1B, the system 100 includes a light source 102; a lens assembly 104; a sample 106 placed between the lens assembly 104 and the light source 102; a detector 108 onto which radiation (arrows) from the lens assembly 104 is focused, a filter 110 positioned between the lens assembly 104 and the detector 108, and a cooling subsystem 112 positioned/thermally coupled to the detector 108 and filter 110 to cool the detector 108 and filter 110 to a predetermined operational temperature.

The operational temperature is a temperature less than a temperature of the sample 106, but may be significantly lower than the temperature of sample 106 in accordance with various aspects of the presently described inventive concepts. For instance, in a preferred embodiment, the cooling subsystem is a cryogenic cooling subsystem. The cooling subsystem may include or be a closed-circuit loop cooling system charged with liquid nitrogen to maintain the detector and/or filter at a temperature of about −195.15 C (78K), the approximate boiling point of liquid nitrogen, at least during operation thereof. To place the present description in a context, much of the present description will, by way of example only, refer to a cryogenic cooling subsystem.

With the exception of the cooling subsystem 112, all components of the system 100 preferably are arranged such that a central axis C extends through a central point of each component, and the components are oriented substantially parallel to a plane perpendicular to the central axis C. As such, the light source 102, lens assembly 104, sample 106, detector 108, and filter 110 may lie substantially along a single linear trajectory defined by central axis C.

Moreover, and as shown schematically in FIG. 1B (not to scale), various components of the system 100 may be characterized by concentric and/or overlapping cross sectional profiles. For instance, in one implementation the light source 102 preferably has a cross sectional area greater than a cross sectional area of the sample 106. The light source 102 may be positioned, in one approach, such that outer boundaries thereof extend beyond outer boundaries of the sample 106 along a plane oriented perpendicular to a central axis extending through a center point of the detector, the sample, and the light source, respectively, e.g. as shown in FIGS. 1A-1B, see central axis C. Accordingly, in one implementation the light source may have a cross sectional area of about 64 in$^2$, and may be defined by a substantially square cross section having sides 8 inches long. The corresponding sample 106 preferably, but optionally, has a cross sectional area less than that of the light source, and may be defined by a substantially square or rectangular cross sectional shape.

By maintaining the relative size and shape constraints the entire sample is all but ensured to receive incident radiation from the light source. This advantageously allows simultaneous interrogation of the entire sample rather than on a point-by-point (pixel-by-pixel) basis. For a detector having a resolution of 1 megapixel (MP), an interrogation time of about one minute (as exhibited by techniques utilizing a fibre or other interrogator) would take an impracticably long duration to sample every pixel. Accordingly, in several embodiments the detector 108 of system 100 may be or include a focal plane array, an infrared camera, or the like as would be understood by a person having ordinary skill in the art upon reading the present disclosure. In an exemplary embodiment, the detector may be characterized by a resolution of about 640×512 pixels.

The light source may be provided in the form of a black body in some embodiments, and during operation of the system 100 preferably the black body is maintained in thermal equilibrium so as to emit substantially uniform thermal radiation. In various embodiments, the light source 102 may comprise any material known in the art to be stable in solid phase across a temperature range from about −5 C to about 150 C. Preferably, where the light source 102 is a black body or other material capable of exhibiting substantially uniform thermal radiation, the light source 102 exhibits a temperature variation of about (e.g. 0.01 C or less, 0.05 C or less, 0.1 C or less 1 C or less, 10 C or less, etc. across a surface thereof, while isotropically emitting substantially uniform thermal radiation. In other embodiments, the light source 102 may include non-uniform thermal radiation sources, such as infrared lasers and/or infrared light emitting diodes (LEDs).

Accordingly, in various approaches the light source 102 may include a head (black body) thermally coupled to a heat source (not shown) to provide sufficient heat to the light source to achieve thermal equilibrium at a temperature preferably in a range from about 75 C to about 150 C, while exhibiting the desired temperature variation as noted above (e.g. 0.01 C or less, 0.05 C or less, 0.1 C or less 1 C or less, 10 C or less). Of course, those having ordinary skill in the art will appreciate that the particular temperature variation may differ in accordance with various embodiments and aspects of the inventive concepts described herein. For example, in some approaches the light source may not exhibit a uniform temperature, so long as the light source exhibits an emission temperature that differs from a temperature of the sample. In more approaches, variations on the order of about 0.01 C to about 10 C may be considered substantially uniform.

In various approaches the light source 102 may comprise one or more materials selected from the group consisting of: aluminum, dull wrought iron, oxidized cast iron, cold-rolled steel, an oxidized alloy of 80 wt % Ni and 20 wt % Cr, platinum black, a chemically-etched nickel phosphorus alloy; vertically aligned carbon nanotubes, and carbon soot. Of course, the foregoing exemplary materials suitable for use in/as the light source is illustrative and the presently disclosed inventive concepts should not be limited in scope by these examples. Skilled artisans reading the present descriptions may appreciate equivalent alternatives to the foregoing examples, which should also be considered within the scope of the inventive embodiments described herein. Moreover, various combinations of the exemplary materials may be employed for the light source, in different approaches.

In more approaches, the light source may comprise or be selected from an infrared laser, and an infrared light emitting diode (LED). In such approaches, the thermal radiation emitted by the light source may not necessarily be substantially uniform, but in all cases the thermal radiation emitted by the IR laser or IR LED includes wavelengths overlapping a predefined water absorption band and/or predefined water absorption line. Preferably, the predefined water absorption band and predefined water absorption line include radiation having a wavelength in a range from about 2.5 µm to about 3.3 µm, in accordance with several embodiments of the inventive concepts disclosed herein.

With continuing reference to FIGS. 1A-1B, and specifically regarding the lens assembly 104, in one embodiment the lens assembly includes at least one objective lens, and is preferably characterized by an f number of about 2.3; a diameter of about 25 mm; and/or a transmission rate of at least 85% in a spectral range corresponding to a water absorption band as defined according to various embodiments herein. The lens assembly 104 is preferably mounted using a bayonet-style mount, although of course other suitable mounting styles that would be appreciated by a skilled artisan upon reading the present disclosure may be implemented without departing from the scope of the inventive concepts presented herein.

Regarding the sample 106, as noted hereinabove preferred materials include polymers and/or inorganic materials typically used in applications including but not limited to photovoltaic cells, display technologies such as OLED and quantum dot devices, etc. as would be appreciated by a person having ordinary skill in the art upon reading the present descriptions. Moreover, it will be appreciated that the system 100 does not require the sample 106 to be present except during interrogation thereof. For instance, and with reference to FIG. 3 and method 300 one exemplary approach involves calibrating the system 100 and does not require the presence of sample 106 to be successfully performed.

Regardless, and solely for purposes of illustrating exemplary materials suitable for use in evaluating presence of water according to the inventive concepts described herein, suitable polymers may include polyvinyl compounds such as ethylene vinyl acetate, polyolefins, siloxanes such as polydimethylsiloxane (PDMS), polyethylene terephthalate (PET), polytetrafluoroethylene (PTFE), and/or combinations thereof, in one implementation. Exemplary inorganic materials may include oxides such as silica and/or alumina, nitrides such as silicon nitride, or any other suitable inorganic material that would be appreciated by a person having ordinary skill in the art upon reading the present descriptions. In various embodiments inorganic materials such as minerals, coatings and raw materials may be suitable samples in which to investigate the presence of water according to the techniques described herein.

Turning now to detector 108, in various approaches the detector 108 may comprise a focal plane array, an infrared camera, or any equivalent thereof that would be appreciated as suitable for imaging a sample illuminated by thermal radiation from a black body in order to detect absorption within a predefined water absorption band based on the imagery. In development, a detector 108 having a resolution of about 640×512 pixels was employed and provided sufficient spatial resolution to allow desired detection of water in test samples.

In one implementation, the detector 108 may be or include a camera with a lens characterized by an f number of about 2.5; a responsivity having a maximum value in a spectral range corresponding to a water absorption band, e.g. from about 2.5 microns to about 3.3 microns, from about 2.7 microns to about 3.1 microns, from about 2.7 microns to about 2.9 microns, etc. as defined herein and in accordance with different implementations of the inventive concepts presented herein. Preferably, within the water absorption band, less than 1% of total signal detected by the camera is from radiation having a wavelength outside the water absorption band.

In more approaches, the camera may be characterized by an integration time (time required to capture an image) of about 30 ms or less, an integration time of about 100 ms or less, an integration time of about 500 ms or less, an integration time of about 1 s or less, an integration time on the order of several (e.g. about 3 to about 5) s or less, or an integration time of about 1 minute or less, in various embodiments.

Still now referring to system 100 and FIGS. 1A-1B, and now specifically to the filter 110, in preferred implementations the filter 110 comprises a bandpass filter configured to exclude or block light having a wavelength outside a predefined water absorption band (e.g. as defined above according to various embodiments), while allowing light having a wavelength or wavelengths that at least partially overlaps the predefined water absorption band to pass on to the detector 108. Accordingly, the filter 110 may be characterized by a blocking range from about 1.5 um to about 5 um, wherein within the blocking range the filter transmits less than about 1% of the radiation having wavelength(s) outside the predefined water absorption band.

In various implementations, the water absorption band may be predefined prior to analyzing the sample so as to tune the sensitivity of the system to a particular absorption band, e.g. an absorption band known to be exhibited by a particular material being investigated, such as a polymer or inorganic material.

With continuing reference to the water absorption band, the filter may be configured to transmit only particular slices, sublines or subbands of an overall range of wavelengths, and may include sublines or subbands within the range of 2.5 to 3.3 µm, e.g. defined to include one or more wavelengths selected from the group consisting of: 1.4 µm, 1.9 µm, 2.5 µm, 2.7 µm, 2.9 µm, 3.2 µm, 3.3 µm, and 7 µm, in various approaches.

Although any suitable type of cooling subsystem 112, preferably a cryogenic cooling subsystem, may be employed without departing from the scope of the presently described inventive concepts, the cryogenic cooling subsystem preferably includes a closed circuit loop cooling system. In one embodiment the cryogenic cooling subsystem may include a liquid nitrogen-based cooling capability, and the cryogenic cooling system may cool the detector and/or filter to a temperature of approximately −195.15 C (78 K). Of course, in other embodiments the cooling subsystem 112 may include or utilize a liquid nitrogen Dewar and appropriate delivery system, may include or utilize dry ice, may include or utilize compression cooling, etc. as would be appreciated by a person having ordinary skill in the art upon reading the present descriptions.

Of course, those having ordinary skill in the art will appreciate that the foregoing components and corresponding features of system 100 may be employed in any suitable combination or permutation thereof. Moreover, materials and components that skilled artisans would consider functionally and/or structurally equivalent to those expressly described above in connection with system 100 may be employed without departing from the scope of the presently described inventive concepts, according to various embodiments.

Having described the various aspects of the inventive system 100 for evaluating water presence/ingress in a non-destructive, in-situ matter, we turn now to exemplary uses and applications of the system 100 in practice.

Uses and Applications

While the foregoing descriptions have been provided with primary reference to evaluating water ingress/presence into materials such as photovoltaic modules, display materials such as OLEDs, quantum dot displays, etc., it should be understood that the presently disclosed inventive concepts are generally applicable to any material through which thermal radiation may be transmitted onto a detector for evaluating a water absorption band. The primary challenge with adapting a given evaluation procedure/technique to a given material requires detailed understanding of any impact on the spectral signature of water due to interaction with the material. In the case of the exemplary materials primarily described herein, the polymers from which various devices are formed tend to elongate wavelengths at which water exhibits absorption, shifting the spectral signature of water towards the infrared or towards the visible portion of the spectrum.

Accordingly, skilled artisans equipped with sufficient knowledge of the impact of interactions between a material and water on the spectral signature of water would be able to adapt the inventive approaches described herein to evaluate presence of water in other materials, particularly other polymers and inorganic materials equivalent to those described hereinabove, without departing from the scope of the present invention.

The presently disclosed inventive concepts are particularly well suited for detecting water ingress into various host materials, particularly materials commonly utilized in photovoltaic cells, organic light emitting diodes (OLED), quantum dots, and various displays or other devices incorporating such components.

In general, investigating water presence using the presently disclosed inventive systems involves two steps: calibration and measurement. The calibration procedure, in one approach, may follow two point non-uniformity correction (NUC), where an image of the black body will be taken at two temperatures (e.g. 25 and 35 deg C., 10 C and 30 C, 25 C and 50 C, 10 C and 150 C, or any other combination of temperatures in a range from about 10 C to about 150 C in one embodiment, or in a range from about 1 C to about 250 C, in other embodiments) and an algorithm will interpolate the gain of each pixel in the focal plane array to ensure flat response of the imaging system. Subsequent measurement involves increasing the temperature of the black body, e.g. to 75-150 C, to provide an infrared emission source and thermal contrast. The sample is placed between the black body and the camera to image relative attenuation of light in the sample within the relevant water absorption band. Additional imaging processing algorithms may be employed to adjust brightness and contrast to enhance identification of high water content sections.

The following description provides a detailed exemplary scenario for setup, calibration, and use of the systems described herein, according to various inventive embodiments. It should be understood this scenario is provided as an illustrative example and is not limiting on the potential scope of use to which the inventive systems described herein may be applied. For instance, different materials may be investigated, different calibration points/temperatures may be employed, different spectral ranges may be investigated/filtered, different preparation and/or performance times may be used etc.

The user investigates a sample to identify the water content, e.g. in various polymer layers of a photovoltaic cell, although the sample may comprise nearly any material permeable/penetrable by water and at least partially transparent to wavelengths of light corresponding to a water absorption band. The user might be interested in how well a packaging material functions as a barrier against moisture, if an edge seal was effective in protecting the inside of the product against water damage, or use water ingress as a proxy for determining delamination between various interfaces (for example between back sheet and encapsulant).

It is assumed that the sample is pre-fabricated and that for some scenarios the sample will be measured both before and after being subjected to accelerated testing conditions for which moisture is at least one of the stressors. The system identifies areas of high water content that in some cases may be indicative of a failure mechanism or normal expected behavior. The differentiation between these cases and interpretation of results is left to the user, who in some instances may develop analysis methods that will serve quality assurance and quality control functions to be performed on a routine basis.

For the first step of analysis the instrument is equipped with an appropriate lens assembly needed for the particular purpose of the measurement (e.g., depending on what kind of sample is tested and desired attributes such as spatial resolution and sample size, different lens assemblies may be employed). The infrared camera detector is turned on and the cryogenic cooling subsystem engaged to lower the temperature of the focal plane array to liquid nitrogen temperature, with an expected latency of less than 10 minutes.

The second step includes camera calibration by running a non-uniformity correction routine. The lens is focused roughly on the working distance for testing the sample under analysis. After focusing the lens, a black body is placed sufficiently close to the camera such that radiation from the black body, and preferably the black body itself, covers the entire field of view of the detector. The black body is turned on and after waiting for a boot up the black body is set to a temperature $T_1$. Upon determining, by a controller managing the heating of the black body, that the black body temperature has achieved a desired stability (e.g. variation of less than 0.01 degrees), the controller directs the camera to acquire a picture of the uniform black body surface.

The user next sets the thermal control to another temperature $T_2$, and again upon determining stability of the black body temperature the controller directs the camera to take another picture of the black body surface. An algorithm running on the system software interface adjusts the parameters of gain and offset of each pixel in the array such that for any sample tested with an apparent temperature between the calibration values, the camera response is flat.

The black body light source is then set to a third temperature $T_3$ higher than the environmental temperature (e.g. a temperature in a range from about 75 C to about 150 C), such that the black body provides background contrast and acts as an illumination source for measuring infrared attenuation in the sample. The foregoing setup and calibration procedure is expected to take 5-10 minutes.

To evaluate water ingress/absorption in situ, the sample under analysis is placed between the black body and the camera, which is focused on an area of interest. The user has the option to adjust both the manual focus and sample position until an acceptable image is displayed on the live video feed window on the software desktop application. An image acquisition panel provides the user the ability to acquire images under different settings that include the frame rate and integration time. Further image processing may include manual adjustment of brightness and contrast, or automatic gain control to optimize the display of the image of the sample. To save an image the user may freeze the live video and save the acquired image in several format files (e.g., native, .bmp and/or .txt) for later use. It is estimated that the time to test a sample is 1-2 minutes.

An image processing analysis menu allows the user to perform digital image processing by scaling the image intensity and converting to an apparent temperature, performing numerical operations on the image such as subtraction, averaging of multiple frames, zoom in/out and pan, etc. as would be appreciated by a person having ordinary skill in the art upon reading the present descriptions. A built in model that uses sample thickness, saturation values and the diffusion coefficient of water in the sample material may produce output including values of interest to the user (e.g. water vapor transmission rate, estimated time to failure, etc.). The response of the processing function is instantaneous (or nearly so) since the data file is size limited by the sensor resolution.

Figure 2:
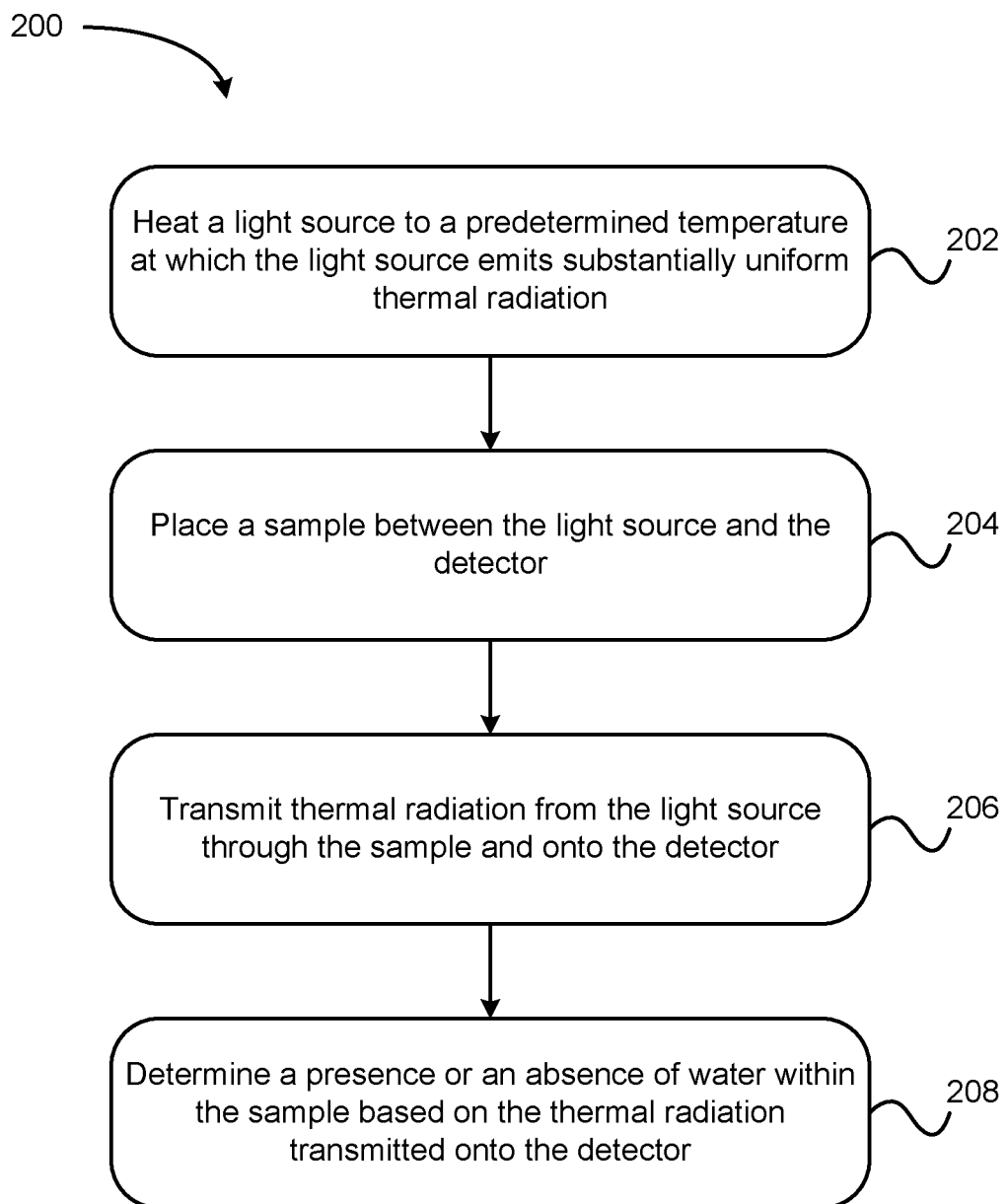
FIG. 2 is a flowchart of a method, according to one embodiment of the presently disclosed inventive concepts.

Accordingly, in one embodiment, the presently described inventive concepts include techniques such as method 200, shown in FIG. 2. The method 200, in various approaches, may be performed in or using any suitable environment, including using system 100 as shown in FIGS. 1A-1B. Of course, more or less operations than those specifically described in FIG. 2 may be included in method 200, as would be understood by one of skill in the art upon reading the present descriptions.

In operation 202, method 200 includes heating a light source 102 to a predetermined temperature. Preferably, in embodiments where the light source 102 is a black body, the heading is performed to a temperature at which the light source 102 emits substantially uniform thermal radiation. In other embodiments, e.g. using infrared lasers or infrared LEDs as the light source, the thermal radiation emitted at the predetermined temperature may or may not be substantially uniform. Regardless, the predetermined temperature, in several illustrative implementations, may be any temperature in a range from about 50 C to about 500 C in one approach, from about 75 C to about 250 C in another approach, from about 75 C to about 150 C in yet another approach, and any combination or range of values between the endpoints set forth above, in various approaches. The heating may be performed using a heater thermally coupled to the light source 102 using any suitable means known in the art.

In operation 204, a sample is placed between the light source 102 and the detector 108. Notably, the sample 106 may be placed between the light source 102 and the detector 108 prior to heating the light source. In embodiments implementing a black body as the light source 102, preferably the sample 106 is placed between the light source 102 and the detector 108 only once the light source 102 has achieved thermal equilibrium and emits the substantially uniform thermal radiation. Additionally, the sample 106 is preferably placed relative to the light 102 source in a position such that the outer edges of the sample 106, as viewed from a perspective from the detector toward the light source 102, are completely encompassed by the light source 102. With reference to FIG. 1B, such an arrangement is shown with the light source 102 outer edges fully encompassing those of the sample 106. Of course, the light source 102 and sample 106 need not have similar shapes, nor a concentric arrangement. Instead, it is important that the thermal radiation from the light source 102 fully encompass/cover the regions of the sample 106 subject to interrogation/evaluation for water presence/ingress.

Returning now to FIG. 2, method 200 also includes operation 206, in which thermal radiation from the light source 102 is transmitted through the sample 106 and onto the detector 108. Notably, the light source is preferably but optionally also transmitted through a filter 110 prior to arrival at the detector. As described hereinabove with regard to FIGS. 1A-1B, the filter 110 is preferably a bandpass filter, but in any case is configured to selectively block wavelengths of light outside a predetermined water absorption band and/or water absorption line (e.g. characterized by a wavelength or wavelengths in a range from about 2.5 μm to about 3.3. μm), and selectively transmit wavelengths of light at least partially overlapping the water absorption band(s) and/or line(s).

Method 200 also includes operation 208, wherein a presence or an absence of water is determined within the sample 106, based on the thermal radiation transmitted onto the detector 108. Detecting the presence of water may include detecting an absorption signal within the water absorption band, indicating the presence of water within the spatial region of the sample corresponding to the pixels of the detector that reported a water absorption signal.

Of course, determining the presence or absence of water may involve much more complex calculations and/or data processing than described above with reference to operation 208. For instance, any of the metrics and/or analyses described herein (such as transmission rate, diffusion coefficient, mapping, etc.) may be included as part of evaluating a sample for the presence and/or ingress of water, in accordance with various embodiments and without departing from the scope of the presently described inventive concepts.

The method 200 as described above may, in various implementations, include any number of additional or alternative operations, features, functions, etc. as described herein without departing from the scope of the presently disclosed inventive concepts.

For instance, in one application, method 200 also includes cooling (preferably cryogenically) at least the filter 110 and the detector 108 using a cooling subsystem 112. The cooling subsystem may include a liquid nitrogen Dewar, a closed circuit loop cooling system, or any other implementation thereof that would be appreciated by a person having ordinary skill in the art upon reading these descriptions. The cooling preferably cools the filter 110 and detector 108 to a temperature below that of the sample 106 so as to avoid thermal noise contributions from the sample's own heat emissions. More preferably, the cooling preferably cools the filter 110 and detector 108 to a temperature of about −195.15 C (78K).

In particularly preferred approaches, method 200 may include calibrating the system, and more specifically calibrating the detector to exhibit a flat response to thermal radiation having a temperature between a first calibration temperature and a second calibration temperature, e.g. between a first calibration temperature of about 25 C and a second calibration temperature of about 35 C, although other temperatures may be utilized as described elsewhere herein.

Calibration generally involves acquiring images of the light source at each calibration temperature, and adjusting gain and/or offset of the pixels of the detector so that the detector exhibits a flat response to samples having an apparent temperature between the two calibration endpoints.

Figure 3:
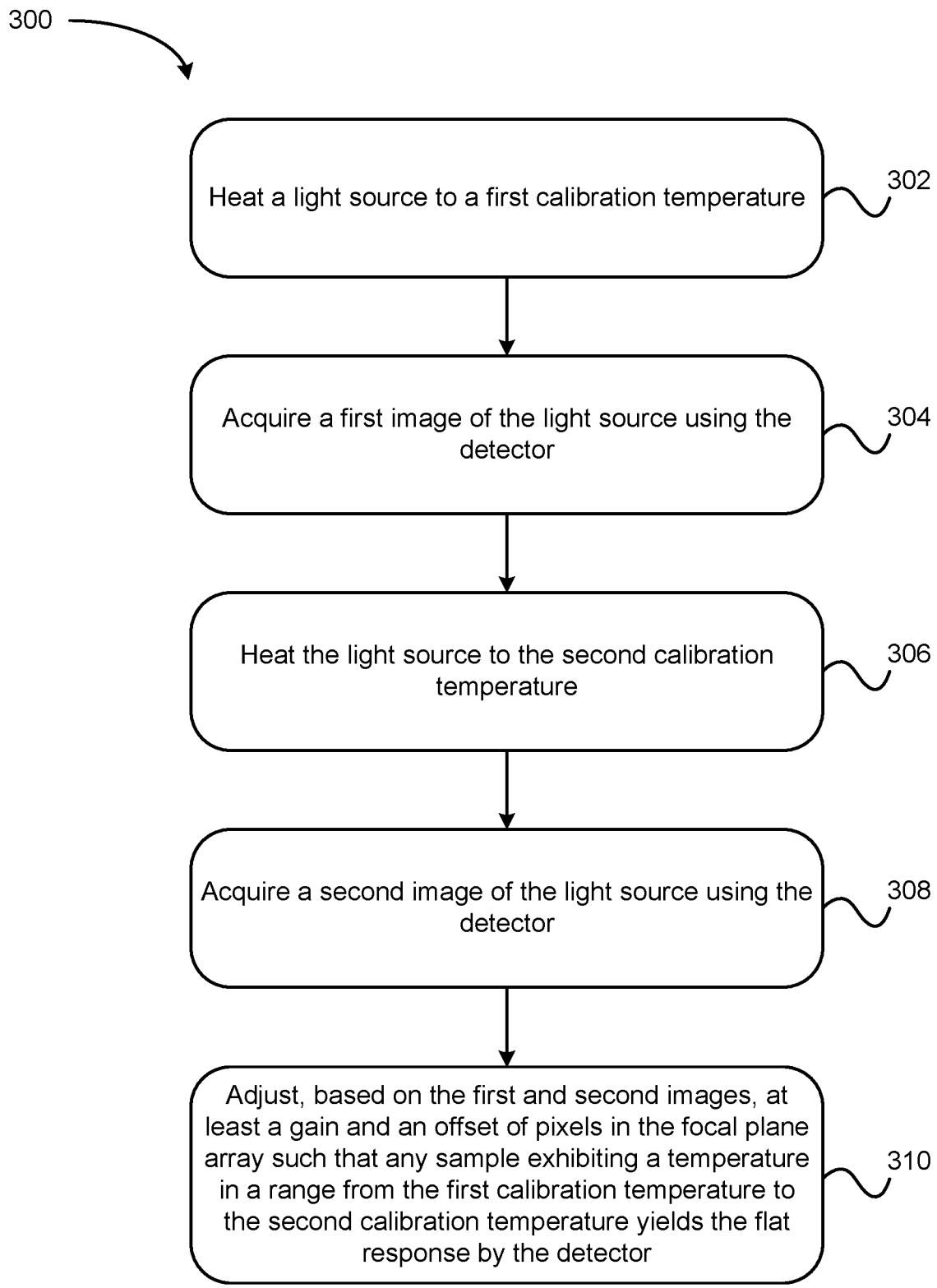
FIG. 3 is a flowchart of a method, according to one embodiment of the presently disclosed inventive concepts.

Accordingly, in particularly preferred approaches the method 200 may include performing a method 300 as shown in FIG. 3. The calibration method shown in FIG. 3 is preferably performed prior to placing the sample in the system as described above with reference to operation 204 of method 200. Calibration in accordance with method 300 involves calibrating the detector to exhibit a flat response to thermal radiation having a temperature between a first calibration temperature and a second calibration temperature.

Accordingly, in operation 302, the light source 102 is heated to a first calibration temperature. The heating may be accomplished using a heater thermally coupled to the light source, and is preferably managed using a controller configured to detect when the light source 102 achieves thermal stability (e.g. temperature variations of about 0.01 C or less for a duration of at least 30 ms, or an amount of time required to capture an image using the detector 108). In one exemplary approach, the first calibration temperature is about 25 C.

Operation 304 of method 300 involves acquiring a first image of the light source 102 using the detector 108.

Method 300 also includes operation 306, in which the light source 102 is heated to a first calibration temperature. The heating may be accomplished using a heater thermally coupled to the light source 102, and is preferably managed using a controller configured to detect when the light source achieves thermal stability (e.g. temperature variations of about 0.01 C or less for a duration of at least 30 ms, or an amount of time required to capture an image using the detector 108). In one exemplary approach, the second calibration temperature is about 35 C.

A second image of the light source 102 is captured using the detector in operation 308 of method 300.

In operation 310, based on the first and second images, at least a gain and an offset of some or all of the pixels in the focal plane array of the detector 108 are adjusted such that any sample exhibiting a temperature in a range from the first calibration temperature to the second calibration temperature yields the flat response by the detector 108.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A system, comprising:
   a light source positioned to transmit thermal radiation through a sample;
   a lens assembly positioned to:
      receive the thermal radiation transmitted through the sample; and
      focus the transmitted thermal radiation onto a filter positioned between the lens assembly and a detector; and
   a cooling subsystem thermally coupled to at least the filter and the detector to cool the filter and the detector to a temperature below a temperature of the sample.

2. The system as recited in claim 1, wherein the light source is a black body in thermal equilibrium, and wherein the thermal radiation is substantially uniform.

3. The system as recited in claim 1, wherein the light source comprises one or more materials selected from the group consisting of: aluminum, dull wrought iron, oxidized cast iron, cold-rolled steel, an oxidized alloy of 80 wt % Ni and 20 wt % Cr, platinum black, a chemically-etched nickel phosphorus alloy, vertically aligned carbon nanotubes, and carbon soot.

4. The system as recited in claim 1, wherein the lens assembly comprises at least one objective lens.

5. The system as recited in claim 1, wherein the detector comprises a focal plane array.

6. The system as recited in claim 1, wherein the detector comprises an infrared camera.

7. The system as recited in claim 1, wherein the filter comprises a bandpass filter.

8. The system as recited in claim 1, wherein the filter is characterized by a blocking range from about 1.5 µm to about 5 µm, wherein within the blocking range the filter transmits less than about 1% of at least portions of the thermal radiation.

9. The system as recited in claim 1, wherein the cooling subsystem is a closed circuit loop cryogenic cooling system.

10. The system as recited in claim 1, wherein the light source is characterized by a first cross sectional area, wherein the first cross sectional area is greater than a second cross sectional area of an analyzed portion of the sample.

11. The system as recited in claim 10, wherein the light source is positioned such that outer boundaries thereof extend beyond outer boundaries of the analyzed portion of the sample along a plane oriented perpendicular to a central axis extending through a center point of the detector, the sample, and the light source, respectively.

12. The system as recited in claim 1, wherein the light source is selected from the group consisting of: an infrared laser, and an infrared light emitting diode; and
   wherein the thermal radiation transmitted from the light source through the sample is characterized by an emission wavelength at least partially overlapping a predefined water absorption band and/or a predefined water absorption line.

13. The system as recited in claim 12, wherein each of the predefined water absorption band and the predefined water absorption line include wavelengths ranging from about 2.5 µm to about 3.3 µm.

14. A method for determining presence or absence of water in the system as recited in claim 1, the method comprising:
   heating the light source to a predetermined temperature at which the light source emits the thermal radiation;
   placing the sample between the light source and the detector;
   transmitting the thermal radiation from the light source through the sample and onto the detector; and
   determining a presence or an absence of water within the sample based on the thermal radiation transmitted onto the detector.

15. The method as recited in claim 14, comprising cooling the detector and the filter, wherein the cooling comprises reducing a temperature of the detector and a temperature of the filter to a temperature less than a temperature of the sample.

16. The method as recited in claim 14, wherein the thermal radiation is a substantially uniform thermal radiation.

17. The method as recited in claim 14, comprising filtering the thermal radiation transmitted through the sample prior to arrival of the thermal radiation at the detector; wherein the filtering:
   selectively transmits, to the detector, first portions of the thermal radiation, the first portions being characterized by a first wavelength at least partially overlapping a predefined water absorption band and/or a predefined water absorption line; and
   selectively blocks second portions of the thermal radiation, the second portions being characterized by a second wavelength outside the predefined water absorption band and/or the predefined water absorption line.

18. The method as recited in claim 17, wherein each of the predefined water absorption band and the predefined water absorption line include wavelengths ranging from about 2.5 µm to about 3.3 µm.

19. The method as recited in claim 14, comprising calibrating the detector to exhibit a flat response to thermal radiation characterized by a temperature between a first calibration temperature and a second calibration temperature.

20. The method as recited in claim 19, wherein the calibrating comprises:

heating the light source to the first calibration temperature;
acquiring a first image of the light source using the detector, wherein the detector comprises an infrared camera having a focal plane array;
heating the light source to the second calibration temperature;
acquiring a second image of the light source using the detector; and
adjusting, based on the first and second images, at least a gain and an offset of pixels in the focal plane array such that any sample exhibiting a temperature in a range from the first calibration temperature to the second calibration temperature yields the flat response by the detector; and
wherein the first calibration temperature is about 25° C. and the second calibration temperature is about 35° C.

* * * * *